(12) United States Patent  
Lim et al.

(10) Patent No.: US 9,407,618 B2
(45) Date of Patent: *Aug. 2, 2016

(54) SYSTEMS AND METHODS FOR DEVICE AND DATA AUTHENTICATION

(71) Applicant: Infineon Technologies AG, Neubiberg (DE)

(72) Inventors: Cheow Guan Lim, Singapore (SG); Stephan Schaecher, Munich (DE); Wieland Fischer, Munich (DE); Bernd Meyer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/152,298

(22) Filed: Jan. 10, 2014

(65) Prior Publication Data

US 2014/0129840 A1    May 8, 2014

Related U.S. Application Data

(63) Continuation of application No. 13/185,825, filed on Jul. 19, 2011, now Pat. No. 8,630,411, which is a continuation of application No. 13/029,789, filed on Feb. 17, 2011, now abandoned.

(51) Int. Cl.
  *G06F 21/00* (2013.01)
  *H04L 29/06* (2006.01)
  *H04L 9/30* (2006.01)
  *H04L 9/32* (2006.01)

(52) U.S. Cl.
  CPC .............. *H04L 63/08* (2013.01); *H04L 9/3066* (2013.01); *H04L 9/3231* (2013.01); *H04L 9/3242* (2013.01); *H04L 9/3271* (2013.01); *H04L 63/0428* (2013.01); *H04L 2209/88* (2013.01)

(58) Field of Classification Search
  CPC ... H04L 63/08; H04L 63/0428; H04L 9/3242; H04L 9/3066; H04L 9/3271; H04L 9/3231; H04L 2209/88
  See application file for complete search history.

(56) References Cited

U.S. PATENT DOCUMENTS

| 6,105,027 A | 8/2000 | Schneider |
| 6,285,985 B1 | 9/2001 | Horstmann |
| 6,356,529 B1 | 3/2002 | Zarom |
| 6,460,138 B1 | 10/2002 | Morris |

(Continued)

FOREIGN PATENT DOCUMENTS

| CN | 1446015 A | 10/2003 |
| CN | 101222772 A | 7/2008 |

(Continued)

OTHER PUBLICATIONS

Bock et al., *A Milestone Toward RFID Products Offering Asymmetric Authentication Based on Elliptic Curve Cryptography*, 14 pages, not dated.

(Continued)

*Primary Examiner* — Lisa Lewis
(74) *Attorney, Agent, or Firm* — Schiff Hardin LLP

(57) ABSTRACT

Embodiments relate to systems and methods for authenticating devices and securing data. In embodiments, a session key for securing data between two devices can be derived as a byproduct of a challenge-response protocol for authenticating one or both of the devices.

10 Claims, 3 Drawing Sheets

(56) References Cited

U.S. PATENT DOCUMENTS

| | | |
|---|---|---|
| 6,664,969 B1 | 12/2003 | Emerson |
| 6,678,821 B1 | 1/2004 | Waugh |
| 6,952,475 B1 | 10/2005 | Horn |
| 6,968,453 B2 | 11/2005 | Doyle |
| 7,047,408 B1 | 5/2006 | Boyko |
| 7,194,629 B2 | 3/2007 | Silverbrook |
| 7,243,232 B2 | 7/2007 | Vanstone |
| 7,313,697 B2 | 12/2007 | Meyer |
| 7,613,924 B2 | 11/2009 | Shankar |
| 7,823,214 B2 | 10/2010 | Rubinstein |
| 2002/0194476 A1 | 12/2002 | Lewis |
| 2004/0243474 A1 | 12/2004 | Vu |
| 2005/0018841 A1 | 1/2005 | Girault |
| 2005/0052661 A1 | 3/2005 | Lapstun |
| 2005/0105884 A1 | 5/2005 | Satoh |
| 2005/0160277 A1 | 7/2005 | Sciupac |
| 2005/0216724 A1 | 9/2005 | Isozaki |
| 2005/0243116 A1 | 11/2005 | Ward |
| 2005/0246763 A1 | 11/2005 | Corcoran |
| 2006/0031790 A1 | 2/2006 | Proudler |
| 2006/0107060 A1 | 5/2006 | Lewis |
| 2006/0146081 A1 | 7/2006 | Vandermeulen |
| 2006/0161571 A1 | 7/2006 | Neill et al. |
| 2006/0161976 A1 | 7/2006 | Kahn |
| 2006/0230276 A1 | 10/2006 | Nochta |
| 2007/0050631 A1 | 3/2007 | Shimizu |
| 2008/0024268 A1 | 1/2008 | Wong |
| 2008/0155271 A1* | 6/2008 | Barck et al. ............ 713/189 |
| 2008/0165955 A1* | 7/2008 | Ibrahim .................. 380/30 |
| 2009/0013381 A1 | 1/2009 | Torvinen |
| 2009/0013410 A1 | 1/2009 | Kaler |
| 2009/0019282 A1* | 1/2009 | Arditti et al. ............ 713/168 |
| 2009/0024352 A1 | 1/2009 | Braun |
| 2009/0070506 A1 | 3/2009 | Furtner |
| 2009/0083834 A1 | 3/2009 | Rubinstein |
| 2009/0235073 A1 | 9/2009 | Braun |
| 2010/0011218 A1* | 1/2010 | Shankar et al. ......... 713/176 |
| 2010/0069086 A1 | 3/2010 | Ahlin |
| 2010/0226495 A1 | 9/2010 | Kelly |
| 2011/0093714 A1 | 4/2011 | Schaecher |
| 2011/0154043 A1 | 6/2011 | Lim |

FOREIGN PATENT DOCUMENTS

| | | |
|---|---|---|
| CN | 101558598 A | 10/2009 |
| DE | 10161137 B4 | 10/2003 |
| DE | 10161138 B4 | 2/2008 |
| DE | 10 2009 051 201 A1 | 5/2011 |
| EP | 1773018 | 4/2007 |
| WO | WO2007107450 | 9/2007 |
| WO | WO2007112791 | 10/2007 |
| WO | WO2008040655 | 4/2008 |

OTHER PUBLICATIONS

Technology Media, *Technology Innovation: Infineon Helps Protect Consumers from Counterfeit Batteries and other Electronic Accessories with World First Authentication Chip Featuring Elliptic Curve Algorithms and Integrated Temperature Sensor*, 2 pages, Sep. 17, 2008.

Hammerschmidt, Christoph, EE Times, *Peripherals authentication could change landscape*, Sep. 28, 2009, 2 pages.

Thomson Reuters, *Infineon Demonstrates Remote PC Peripherals Authentication Capability With ORIGA™ Authentication Chip Using Intel*, 2 pages, Sep. 22, 2009.

Infineon Origa, *Original Product Authentication Solution SLE95050F1*, Published by Infineon Technologies North America, © 2009, 3 pages.

Origa™ SLE95050 *Original Product Authentication and Brand Protection Solution*, Short Product Information, www.infineon.com/ORIGA, Version 1.50, 19 pages, Jun. 2009.

Origa™—*Original Product Authentication & Brand Protection Solution—SLE 95050*, 2 pages, © 1999-2009.

Anderson, Ross, *Cryptography and Competition Policy—Issue with 'Trusted Computing'*, 21 pages, presented at $2^{nd}$ Annual Workshop on Economics & Information Security on May 29, 2003.

RSA Laboratories, *3.6.1 What is Diffie-Hellman?*, available at www.rsa.com/rsalabs/node.asp?id=2248 as of Feb. 16, 2011, © 2010, 2 pages.

IBM, IBM e-server Cryptographic Coprocessor Security Module, Aug. 29, 2007, pp. 1-32.

Krhovjak, Jan, *EMV: Integrated Circuit-Card Specifications for Payment Systems*, dated Feb. 20, 2006, Faculty of Informatics, Masaryk University, pp. 1-13.

*Better Protection from Client to Data Center Made Possible with New Trusted Computing Group Storage Device Specifications*, Jan. 27, 2009, www.wikipedia.com.

Texas Instruments, "Battery Authentication and Security Schemes", Jul. 2005, SLUA346 (Application Report), pp. 1-7.

Texas Instruments, Battery Pack Security and Authentication IC for Protable Applications (bqSecure TM) (bq26150) SLUTS641B, Jan. 2005—Revised Nov. 2009.

Stradling Duncan, "Biometric ID ePassports: Everything's Changed and Nothing's Changed", 2007, www.SecurityWorldMag.com , pp. 1-6.

Office Action dated Mar. 27, 2014 for Chinese Patent Application No. 201210036275.1 (with English translation).

\* cited by examiner

SYSTEMS AND METHODS FOR DEVICE AND DATA AUTHENTICATION

RELATED APPLICATIONS

This application is a continuation of application Ser. No. 13/185,825 filed Jul. 19, 2011, which in turn is a continuation of U.S. application Ser. No. 13/029,789, entitled "SYSTEMS AND METHODS FOR DEVICE AND DATA AUTHENTICATION" and filed Feb. 17, 2011, both of which are incorporated herein by reference in their entireties.

TECHNICAL FIELD

The invention relates generally to authentication in electronic devices and more particularly to providing both device and data authentication at the same time.

BACKGROUND

Modern anti-counterfeiting techniques generally can be divided into two classes, namely methods that exploit specific physical properties related to the items to be protected and methods that are based on digital techniques. Typically, these latter methods rely on properties of cryptographic algorithms.

In the physical approach to anti-counterfeiting solutions, the properties to be verified are either features of the item itself (e.g. surface structure) or are technically connected to the item in an irremovable way. Examples include holograms, seals, security labels, water marks, micro marks, chemical marks, special papers and reproduction techniques, fluorescent colors, laser engravings, special coatings and paints, and many more. Methods for marking products or packages rely on special manufacturing steps or special materials that are not commonly available and require highly sophisticated technical production and handling capabilities. The general philosophy behind physical property-based anti-counterfeiting techniques is that there is a substantial and sufficiently large technological gap between the producer of the security mark and the attacker. It is the hope that an attacker trying to create counterfeit products does not have access to the necessary materials, or that cost and complexity of the process of creating forgeries would make the attack unattractive. The ongoing dissemination of knowledge about the technical details and machines for product marking, however, particularly in the age of the Internet, results in a permanent battle between legitimate manufacturer and counterfeiter.

Most physical anti-counterfeiting techniques need some special treatment of items or packages during the manufacturing process, and it is often difficult to verify the genuineness of the artificial marks in an automated way. For example, chemical marks have to be analyzed in a laboratory for their verification.

In contrast, cryptographic methods gain their security only from the secrecy of key material and do not rely on the belief that the manufacturer is technologically superior to the attacker. The level of protection offered by cryptographic schemes depends mainly on the length of the secret keys involved and can easily be scaled such that any straightforward attack becomes impossible. Authenticity of data can be achieved by algorithms for generation and verification of message authentication codes and digital signatures. These algorithms prevent the creation of data for counterfeit products, but they cannot protect against the copying and cloning of valid authentication data of genuine products. In order to provide security against counterfeiting, the authenticity of the item needs to be checked. Therefore, it is typically necessary for the authentication data to be bound to a physical object like a smart card or a security integrated circuit (IC). In this situation, the protection mechanisms of the hardware prevent unauthorized access to key material or authentication data. Verification of the authenticity of items is accomplished by active protocols between the verifier and the item to be tested.

There exist conventional schemes using only data authentication and a database of all genuine products. These schemes establish an electronic pedigree of the products and offer protection from forgery because an attacker is not able to authenticate fake data on its own. But because genuine data can be copied easily, it is not possible to detect cloned products without on-line access to the background database of all products. Even if inconsistencies with entries in the database were detected, the scheme does not distinguish between genuine products and clones.

In the literature, many cryptographic techniques for data authentication have been published. These algorithms typically append additional information for authentication (authenticator, authentication data) to the original data. The authenticator is a function of the original data and a secret key. The authenticator assures that the original data has not been manipulated and that the data is genuine. The cryptographic mechanism guarantees that no attacker is able to compute a valid authenticator without knowledge of the secret key, even if he knows already many valid pairs of data and the corresponding authenticator. Moreover, the cryptographic scheme ensures that the attacker cannot extract the secret key from many valid pairs of data and adjoined authenticator. Interactive methods, e.g. challenge-response protocols, and non-interactive methods, e.g. message authentication codes (MAC) using symmetric key management and digital signature schemes using asymmetric key management, also exist.

Several semiconductor manufacturers currently offer security ICs for the detection of counterfeit products. There exist products for contactless verification based on radio frequency identification (RFID) and wired components. In one scheme, the components implement a challenge-response protocol: the host (verifier) sends a randomly chosen challenge to the security device. The security device in turn computes a message authentication code (for example using a keyed hash function) depending on the challenge and the secret key stored in the device and sends the authentication data back to the host. If the security device uses symmetric key management, the host knows the secret key, repeats the computation, and compares the two results. If the results are equal then the device has proven knowledge of its secret key and will be considered authentic. Almost all available low-cost security devices for anti-counterfeiting follow this design approach.

Since the secret keys of all security devices to be verified have to be known to the host, special care has to be taken to protect the keys stored in the host. In most applications the host contains a special security device (for example a smart card) to protect the secret key.

There also exist several security devices for anti-counterfeiting using asymmetric key management. In the literature, small VLSI (very large scale integration) devices for the computation of ECDSA (elliptic curve digital signature algorithm) signatures and devices implementing asymmetric challenge-response protocols have been described. A passive RFID tag using an asymmetric challenge-response protocol, for example, is available as a prototype, and the security IC ORIGA available from INFINEON TECHNOLOGIES AG can be used for applications with wired interface.

Asymmetric key management has many benefits over the symmetric approach since there is no secret key information necessary in the host device. This allows the host side of the protocol to be implemented completely in software. This is especially advantageous for large decentralized applications in which an attacker can get access to and control of host devices. All practically relevant applications based on asymmetric key management derive their security from the assumed hardness of computing discrete logarithms in the group of points of some elliptic curve defined over finite fields of characteristic two. This specific mathematical structure offers the best ratio of cryptographic security versus length of the parameters and allows low-cost and small foot-print VLSI implementations with low power consumption.

Another aspect of authentication, however, relates to the protection of data exchanged by devices, beyond the authentication of the devices themselves. Even if a set of devices has been authenticated, critical data sent or received by the devices can be vulnerable. For example, a non-authenticated device can intercept communications and tamper with data, which can go undetected even if the original devices were authenticated. Wireless devices, particularly those used in public spaces, can be especially vulnerable to such interceptions, often referred to as "man-in-the-middle" or "piggyback" attacks. Existing solutions often use a session key, which is typically so long that decoding data quickly is difficult or impossible. Further, session keys known only to the parties exchanging information need to be established, with the keys and the process(es) for establishing them kept secure.

Therefore, there is a need for improved authentication systems that address both device and data security.

SUMMARY

Embodiments relate to systems and methods for authenticating devices and securing data.

In an embodiment, a method for the authentication of data and/or devices comprises reading informational data from a slave device by a host device; and verifying an authenticity of both the slave device and the informational data by the host device using an authentication key pair, the authentication key pair comprising a secret authentication key stored in the slave device and a public authentication key known to the host device.

In an embodiment, a first device is configured to read informational data from a second device; and verify an authenticity of the second device and the informational data using an authentication key pair comprising a secret authentication key stored in the second device and a public authentication key known to the first device.

In an embodiment, a first device is configured to output informational data to a second device; and provide a secret authentication key to be used to verify an authenticity of the first device and the informational data, wherein the secret authentication key forms part of an authentication key pair with a public authentication key known to the second device.

In an embodiment, a method comprises reading informational data from a second device by a first device; and verifying an authenticity of the second device and the informational data by the first device using an authentication key pair comprising a secret authentication key stored in the second device and a public authentication key known to the first device.

In an embodiment, a method comprises outputting informational data to a second device by a first device; and providing, by the first device, a secret authentication key to be used to verify an authenticity of the first device and the informational data, wherein the secret authentication key forms part of an authentication key pair with a public authentication key known to the second device.

BRIEF DESCRIPTION OF THE DRAWINGS

The invention may be more completely understood in consideration of the following detailed description of various embodiments of the invention in connection with the accompanying drawings, in which.

Figure 1A:
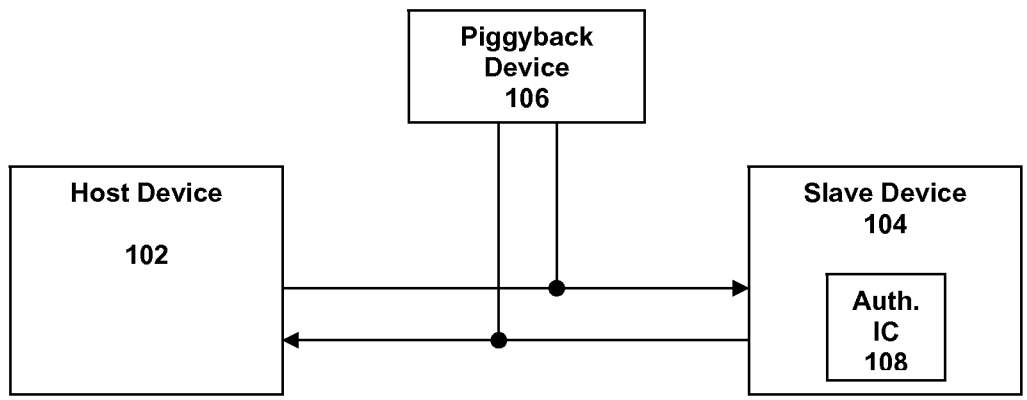
FIGS. 1A-1C are block diagrams of piggybacking schemes.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Embodiments relate to systems and methods for authenticating devices and securing data. In embodiments, a session key for securing data between two devices can be derived as a byproduct of a challenge-response protocol for authenticating one or both of the devices.

The protocol can utilize elliptic curve asymmetric authentication in one embodiment. An elliptic curve E over a finite field K is the set of solutions (x, y) in K×K of a cubic equation $y^2+a_1xy+a_3y=x^3+a_2x^2+a_4x+a_6$ without singular points, where $a_1$, $a_2$, $a_3$, $a_4$, and $a_6$ are elements of the finite field K. Adding the point at infinity O as zero element, the points of the elliptic curve form a finite abelian group. The group law is defined by the algebraic fact that each line through two points P and Q of E intersects the curve at a third not necessarily different point R and the sum P+Q+R=0 is the zero element. (If P=Q then the tangent line intersects the curve in R.)

Analogously to vector spaces, the scalar multiplication k*P is defined where k is an integer and P a point of E. Then k*P denotes the k-fold addition of P. For cryptographically strong elliptic curves the scalar multiplication k*P=S is a one-way function, e.g. it is possible to compute k*P in time polynomial in the length of the parameters but given P and S there are only algorithms with exponential running time known for the computation of the scalar k. This one-way function is the basis for the security of cryptographic protocols using elliptic curves. While embodiments are directed to authentication and security generally and for any number of reasons appreciated by those skilled in the art, the prevention of so-called "man-in-the-middle" or "piggyback" attacks is one goal. A piggyback attack, for example, is an attack scenario that does not attack the authentication between devices per se but rather that circumvents the protection intended by the authentication device by intercepting, controlling and/or altering the communication(s). Many business models rely on the usage of authorized replacement parts, consumables that record usage information, and/or lifetime counters to prevent use of counterfeit accessories, unauthorized refills, and/or longer use of an accessory or consumable than is safe or intended. An example that will be used herein throughout is that of a medical device with an accessory, for example a medical pump to deliver a fluid medication to a patient and which tracks a level of the medication in a medication cassette, though this is not in any way to be considered a limiting example or exclusive embodiment.

Figure 1B:
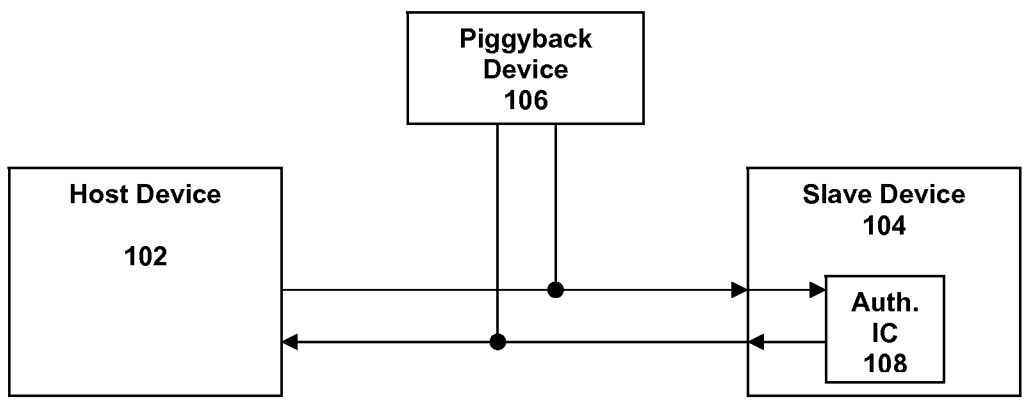
Figure 1C:
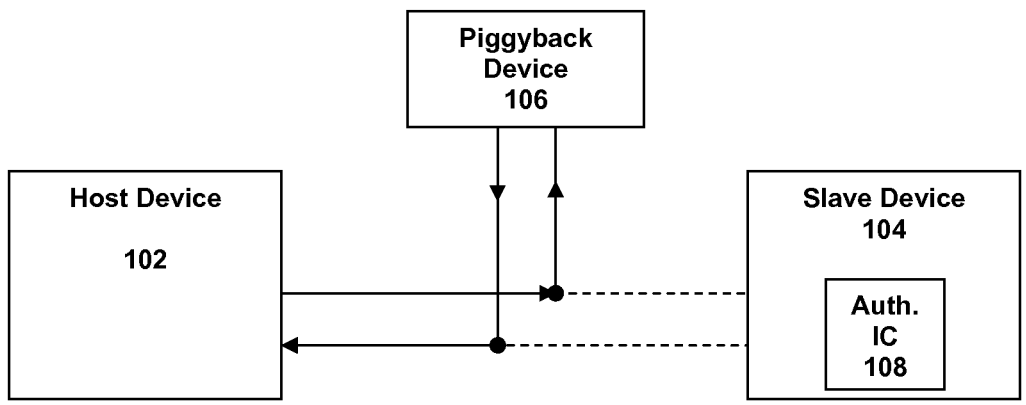

Referring to FIG. 1, a host device 102 and a slave device 104 are configured to exchange communications. In FIG. 1A, an unauthorized piggyback device 106 intercepts, controls and/or otherwise alters communications between host 102 and slave device 104. The communications can be wired or wireless. Referring to FIGS. 1B and 1C, piggyback device 106 can let only communications necessary for authentication of slave device 104 to host device 102 via an authentication integrated circuit (IC) 108 pass (FIG. 1B) before assuming control of communications (FIG. 1C). If host device 102 attempts to write usage information to slave device 104 and/or increase or decrease a unidirectional counter, piggyback device 106 can intercept the write data and store the data in its own memory. If host device 102 wants to check write data, read back data or check a counter from slave device 104, piggyback device 106 can intercept the communication and instead provide data from its own memory, thereby providing host device 102 with expected data to not trigger any suspicion.

In the medical device (host device 102) and medication cassette (slave device 104) example, piggyback device 106 can mask refilling of the cassette. This can be a commonly attempted practice that is generally undesired by physicians and other medical professionals, and/or pharmaceutical companies and medication cassette manufacturers. Once the cassette is authenticated to the medical device, there is no further authentication of the data exchanged between the devices.

Embodiments discussed herein therefore aim to prevent such piggybacking, in part by providing both device and data authentication at the same time. In one embodiment, this is accomplished by authenticating the device and data in a communication and using a session key derived from the communication, and known to both host and slave devices but not transmitted and therefore not vulnerable to piggybacking, to authenticate data in subsequent communications until the session key needs to be refreshed.

Figure 2:
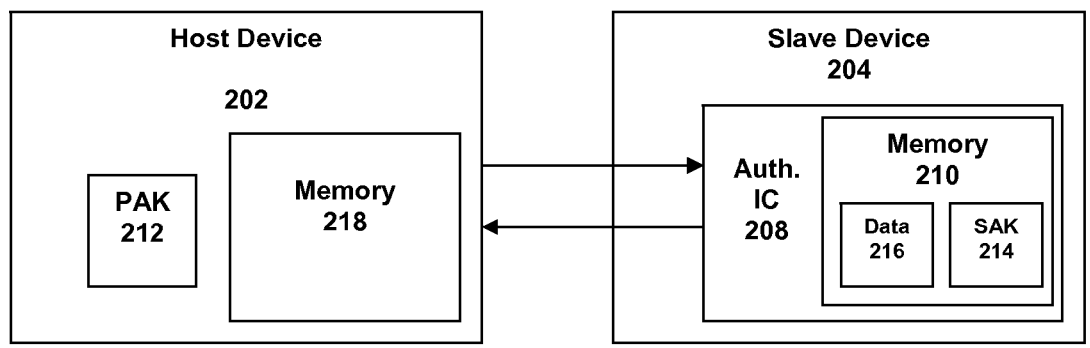
FIG. 2 is a block diagram of a system according to an embodiment.

Referring to FIG. 2, an authentication system 200 is depicted. System 200 comprises a host device 202 and slave device 204. Host device 202 can comprise a mobile phone; personal digital assistant (PDA); camera; MP3 player, gaming system, audio and/or video system, or other entertainment device; computer, computer system, network or computing device; copy machine, scanner, all-in-one or other digital imaging or reproduction device; medical device or equipment or diagnostic supply; automobile or automotive system; industrial system; or some other electronic or computer device. Slave device 204 can comprise a battery; an accessory, including earphones, a headset, speakers, a docking station, a game controller, a charger, a microphone and others; a toner cassette, magazine, chamber or similar holder; a computer or computer system component, network device, peripheral, USB or other storage device; automotive part, component or accessory; industrial component or part; or some other part, accessory or component, and for which authentication is required or desired.

In embodiments, slave device 204 is a replacement component, such as an aftermarket accessory or battery, though slave device 204 can also be an original part. Slave device 204 can be provided by the same manufacturer or provider as host device 202 or by some other party, such as an authorized manufacturer and/or distributor of replacement and aftermarket parts and accessories. While slave device 204 is depicted as being external to host device 202, slave device 204 can operate within or as part of host device in embodiments. For example, an embodiment referred to herein throughout is that of a medical device and medication cassette, in which the medication cassette operates within the medical device. In another embodiment, host device 202 can comprise a mobile telephone and slave device 204 a wireless earpiece or other accessory operating with but outside of the phone. Neither example, however, is limiting.

Slave device 204 includes an authentication IC 208. Authentication IC 208 comprises a semiconductor chip in an embodiment and includes memory 210. In an embodiment, the functionality and features of authentication IC 208 are realized as one or more system-on-chip components of slave device 204 to achieve cost or size savings. For example, slave 204 can comprise a BLUETOOTH headset, which often is of small size and therefore may not be able to accommodate an additional IC 208. Instead, the features and functionality are integrated on an existing chip in the headset, saving space and possibly also costs. In such an embodiment, a manufacturer of the headset or other device comprising slave 204 can be provided with, for example, a VHDL netlist for integration into an existing controller or processor of the headset or other device in place of a discrete authentication IC 208, which little or no change in the features, functions and security thereby provided.

Memory 210 is non-volatile memory in an embodiment. Memory 210 can hold a private or secret authentication key (SAK) 214, described in more detail below, as well as data 216. In embodiments, data 216 is transformable and protectable from manipulation, such as by piggybacking, by the authentication systems and methodologies discussed herein. For example, data 216 can comprise a unidirectional counter that only increments or only decrements, as can be the case when slave device 204 comprises a consumable like a medical cassette and host 202 is a medical device controlling the counter to a maximum or zero, respectively.

At the start of the authentication procedure, host device 202 holds a public authentication key (PAK) 212, and authentication IC 208 holds SAK 214 as well as data 216 to be cryptographically authenticated. PAK 212 and SAK 214 form an authentication key pair.

Figure 3:
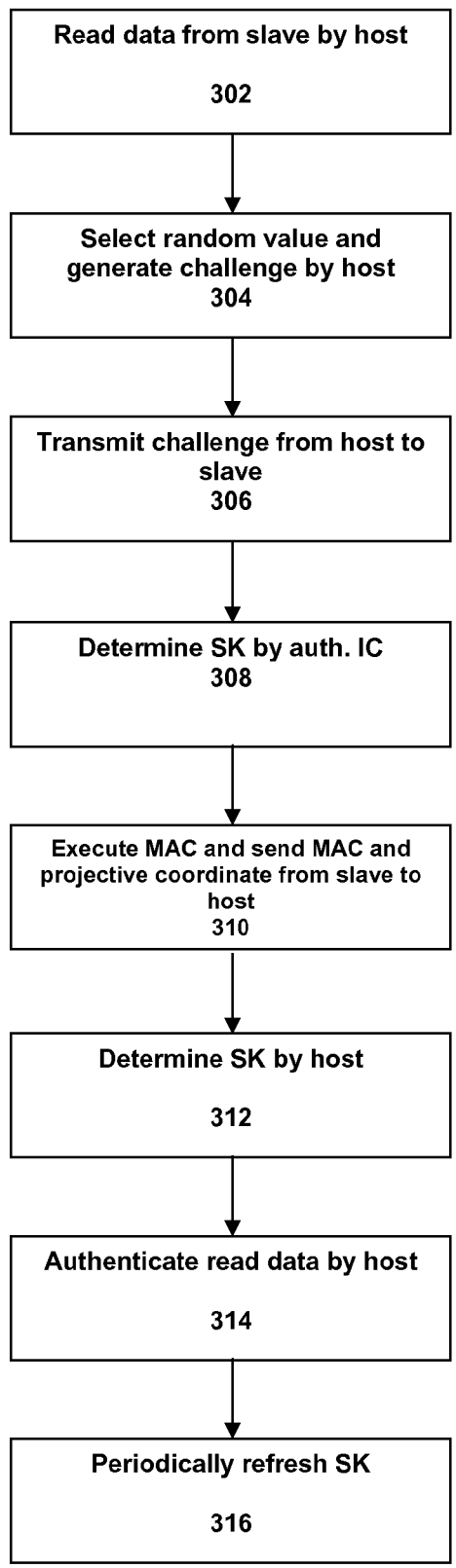
FIG. 3 is a flowchart of a method according to an embodiment.

Referring also to FIG. 3, host device 202 reads data 216 from slave device 204 in a first communication at 302. Communications between host 202 and slave 204 can be wired or wireless in embodiments. At 304, host device selects a random value $\lambda$ and generates a challenge. In an embodiment, the challenge, $x_A$, comprises the affine x-coordinate of a point A on a curve that is the scalar multiple of a base point, P, of a curve represented by its affine x-coordinate, $x_P$, with the chosen random value $\lambda$. In other embodiments, the challenge can be generated from the random number as well as additional data. At 306, the challenge, A, represented by $x_A$, is transmitted from the host 202 to the slave 204 in a second communication.

Upon receipt of the challenge, authentication IC 208 generates a slave-side session key (SK) at 308. Generally, authentication IC 208 determines projective coordinates $X_B$ and $Z_B$ for a point B on the curve and then applies a function f to get $SK=f(X_B, Z_B)$.

More particularly, in one embodiment, authentication IC 208 determines $X_B$ and $Z_B$ by a scalar multiplication of the challenge A, represented by $x_A$, with SAK 214. Authentication IC 208 then selects a number of bits, of length L, from one of the coordinates to form a slave-side session key (SK). In this example, coordinate $X_B$ will be used, but in other embodiments $Z_B$ can be used instead. The number of bits and therefore the integer L can also vary in embodiments.

Slave-side session key SK is then written into a register or memory 210 in authentication IC 208 for subsequent data authentications. Slave-side session key SK, being a key associated with a session, is regenerated for each authentication procedure in embodiments.

Next, authentication IC 208 applies a function g to the projective coordinates $X_B$ and $Z_B$ to get data $w=g(X_B, Z_B)$, which is sufficient for host 202 to identify and compute the actual projective representation of the point B used in slave 204.

More particularly, in one embodiment, authentication IC 208 executes a message authentication code (MAC) algorithm or fingerprint for slave device 204 and the data and sends the MAC and projective coordinate $Z_B$ (or $X_B$ in embodiments in which $Z_B$ was used as the source of the slave-side session key SK) to host device 202 in a third communication at 310. The MAC functions as an authentication stamp of sorts that ensures data exchanged between host 202 and slave 204 is not manipulated.

Host device 202 then determines a host-side session key (SK') at 312. For example, host device 202 calculates, in a first step, the affine coordinate $x_C$ of a point C on the curve by a multiplication of the chosen random value λ with the affine x-coordinate of public key 221 as an expected response value. Then, host device 202 applies a function h to the expected response value $x_C$ and the data w received from slave device 204, resulting in a host-side session key $SK'=h(x_C, w)$. If the process has been successful thus far in that authentication will succeed, SK=SK'.

More particularly, in one embodiment, host 202 has calculated or then calculates the affine coordinate $x_C$ of a point C on the curve by a multiplication of the chosen random value λ with the affine x-coordinate of public key 212. Host device 202 then multiplies $x_C$ with $Z_B$ received from slave device 204 to determine the projective coordinate $X_B$. Host device 202 next takes L bits from $X_B$ to determine the host-side session key SK' and writes host-side session key SK' to memory 218, such as RAM, for use in subsequent data authentications.

Using SK', host device 202 can attempt to authenticate the data previously read from slave device 204 at 302, at 314. This can be done by verifying that the MAC received from slave device 204 at 310 belongs to the data received from slave device at 302.

In subsequent authentications of data between host 202 and slave 204 given that SK and corresponding SK' have been determined, host 202 need only write the data into memory 210, and the slave need only respond with the MAC of the data, calculated with the same SK. This continues for some period of time, after which SK and SK' can be refreshed at 316 by running another device authentication, in order to protect SK and SK' and maintain authentication. The period of time can vary, as understood by those skilled in the art, such as according to the strength of the MAC or fingerprint function.

Returning to the aforementioned example in which data 216 comprises a unidirectional counter that only increments or only decrements, as can be the case when slave device 204 comprises a consumable such as a medication cassette and host 202 is a medical device controlling the counter to a maximum or zero, respectively, the aforementioned authentication procedure can prevent piggybacking of the counter write. In such an embodiment, host 202 can write a new value to the counter (data 216), and slave 204 can then respond with the MAC based on that write, which can be verified by the host 202. Both data and the direction of counter movement based on the write can be verified, or just the data, in embodiments, thereby preventing an overwriting attack.

A unidirectional counter can also be used as a countermeasure against manipulation of write data. For example, and returning to the medical device and medication cassette example, a medication cassette could be temporarily removed from a medical device to be used in another medical device. If a unidirectional counter property is installed and in use, any attack would be limited to manipulating data in a counter direction unfavorable to the attacker.

In embodiments, such authentication can be carried out for each write or update of data from host 202 to slave 204 by writing the data and reading the data back with the MAC to ensure it was written properly. In some embodiments, however, this can be too time-consuming. Therefore, it is also possible to authenticate the write or update of data only every other time or in some other interval that provides sufficient security for the application while operating in a sufficiently efficient manner.

In other embodiments, slave device 204 can authenticate data sent to it by the host, in order to ensure that the data originated in the host. In other words, slave 204 can authenticate host 202, as host 202 authenticated slave 204 hereinabove.

In embodiments, the systems and methods address weaknesses and drawbacks of conventional solutions by determining a session key known to both sides as a byproduct of a challenge-response protocol implemented between the devices. In embodiments, the challenge-response protocol is carried out according to an asymmetric encryption methodology, for example an elliptic curve cryptographic algorithm. In another embodiment, an RSA cryptographic algorithm or some other cryptographic algorithm is used.

Embodiments can also utilize public key infrastructures (PKI) and certificates. For example, in an embodiment, a system comprises a first device comprising a secret authentication key and a public authentication key, forming an authentication key pair, and a certificate of the public authentication key digitally signed using a secret signing key of a PKI, and a second device comprising a public verification key forming a key pair with the secret signing key of the PKI to authenticate the certificate and the public authentication key read from the first device. Refer also to PKI and certificates such as are discussed in co-owned and co-pending U.S. patent application Ser. No. 12/582,362, entitled "SYSTEMS AND METHODS FOR ASYMMETRIC CRYPTOGRAPHIC ACCESSORY AUTHENTICATION," filed on Oct. 20, 2009, and Ser. No. 12/645,062, entitled "SYSTEMS AND METHODS FOR CRYPTOGRAPHICALLY ENHANCED AUTOMATIC BLACKLIST MANAGEMENT AND ENFORCEMENT," filed on Dec. 22, 2009, which are hereby incorporated by reference in their entireties.

Embodiments provide secure authentication of accessories, batteries, parts and other objects at a lower cost suitable for price-sensitive applications. Additionally, embodiments provide device and data authentication simultaneously, preventing so-called man-in-the-middle and piggyback attacks and providing enhanced security through cost-effective authentication.

Particular examples and embodiments discussed herein are not to be limiting and rather are used to illustrate broader beneficial concepts and ideas. For example, the medical device and medication cassette embodiment is but one example of a host and slave device system. Further, the particular coordinates and functions discussed herein above are also not limiting. For example, any suitable extraction function understood by those skilled in the art could be used to derive the session key, and particular coordinates used at various points could be replaced with other coordinates.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, implantation locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A method for the authentication of data and/or devices comprising:
   reading informational data from a slave device by a host device;
   receiving, by the host device, authentication data associated with the informational data and generated based on a slave-side session key; and
   verifying an authenticity of both the slave device and the informational data by the host device using the authentication data and a host-side session key, wherein the slave-side session key and the host-side session key are generated based on a secret authentication key stored in the slave device and a public authentication key known to the host device, respectively.

2. The method of claim 1, wherein the authentication data is received from the slave device.

3. The method of claim 1, wherein reading informational data comprises: reading a counter value from the slave device.

4. The method of claim 3, wherein reading informational data comprises: reading a unidirectional counter value from the slave device.

5. The method of claim 1, further comprising: writing data to the slave device by the host device.

6. The method of claim 1, wherein the informational data comprises: consumable information associated with a consumable of the slave device.

7. The method of claim 1, wherein the slave-side session key is generated based on the secret authentication key stored in the slave device and a challenge.

8. The method of claim 7, wherein the challenge is generated by the host device.

9. A first device, comprising:
   circuitry configured to:
      read informational data from a second device;
      receive, from the second device, authentication data associated with the informational data and generated based on a second device session key; and
      verify an authenticity of the second device and the informational data using the authentication data and a first device session key, wherein the second device session key and the first device session key are generated based on a secret authentication key stored in the second device and a public authentication key known to the first device, respectively.

10. A method comprising:
   reading informational data from a second device by a first device;
   receiving, by the first device, authentication data associated with the informational data and generated based on a second device session key; and
   verifying an authenticity of the second device and the informational data by the first device using the authentication data and a first device session key, wherein the second device session key and the first device session key are generated based on a secret authentication key stored in the second device and a public authentication key known to the first device, respectively.

* * * * *